Dec. 1, 1959 P. S. PETERSEN 2,914,843

MACHINE FOR ATTACHING ELECTROLYTIC CONDENSERS

Filed Oct. 31, 1955 4 Sheets-Sheet 1

INVENTOR.
PAUL S. PETERSEN
BY
William C. Stueber
ATTORNEY

MACHINE FOR ATTACHING ELECTROLYTIC CONDENSERS

Filed Oct. 31, 1955 4 Sheets-Sheet 2

INVENTOR.
PAUL S. PETERSEN
BY
William C. Stueber
ATTORNEY

Dec. 1, 1959 P. S. PETERSEN 2,914,843

MACHINE FOR ATTACHING ELECTROLYTIC CONDENSERS

Filed Oct. 31, 1955 4 Sheets-Sheet 3

INVENTOR.

PAUL S. PETERSEN

BY William C Stueber

ATTORNEY

MACHINE FOR ATTACHING ELECTROLYTIC CONDENSERS

Filed Oct. 31, 1955 4 Sheets-Sheet 4

INVENTOR.
PAUL S. PETERSEN
BY
William C. Stueber
ATTORNEY 2,914,843
Patented Dec. 1, 1959

2,914,843

MACHINE FOR ATTACHING ELECTROLYTIC CONDENSERS

Paul S. Petersen, St. Louis Park, Minn., assignor to General Mills, Inc., a corporation of Delaware Application October 31, 1955, Serial No. 543,707

6 Claims. (Cl. 29—203)

The present invention relates to improvements in automatic machinery for assembling electrical circuitry.

Developments in the electrical circuitry art have included the use of printed circuits which eliminate the need for wires to interconnect the end of the components in circuits. The printed circuit boards are formed of a plate of non-conducting material which has lines of conducting metal etched, embedded or otherwise attached to the surface. These lines usually terminate in holes which extend through the board and electrical components are attached to the board by projecting their leads through the holes and soldering the leads to the conducting lines. This completes the electrical circuit.

To reduce the cost of these improved circuits, the circuits can be assembled by automatic machinery. Such machinery must be capable of attaching components of various types since circuits include many different kinds of components. The present invention concerns itself with an automatic machine which is capable of attaching such components as electrolytic condensers to circuit boards. Basically these components are characterized by being enclosed in a container, such as a metal can, which has terminals projecting from the bottom of the container. The container is usually cylindrical in form and is attached to the circuit board by having the terminals inserted into the holes in the circuit board.

Accordingly, an object of the invention is to provide an improved mechanism which will attach components such as electrolytic condensers to circuit boards and will operate automatically to be capable of repeatedly attaching electrolytic condensers accurately and securely to circuit boards.

A more specific object of the invention is to provide a mechanism which will receive component containers from a supply magazine in a horizontal position and will rotate the containers to a vertical position and accurately locate them over the holes in the circuit board so that they may be attached to the board.

Another object of the invention is to provide an improved gripping and carrying mechanism for receiving the electrolytic condensers from the magazine and for transporting them to an attaching position.

Another object is to provide an improved centering mechanism which will accurately locate the condenser so that when it is pushed against the board the terminals will be accurately positioned with respect to the holes in the board.

A further object of the invention is to provide an improved magazine and an improved gate for releasing individual condensers from the magazine in which they are kept in a horizontal stacked relationship.

Other objects and advantages will become more apparent in the following specification and claims taken in connection with the accompanying drawings in which:

Figure 1:
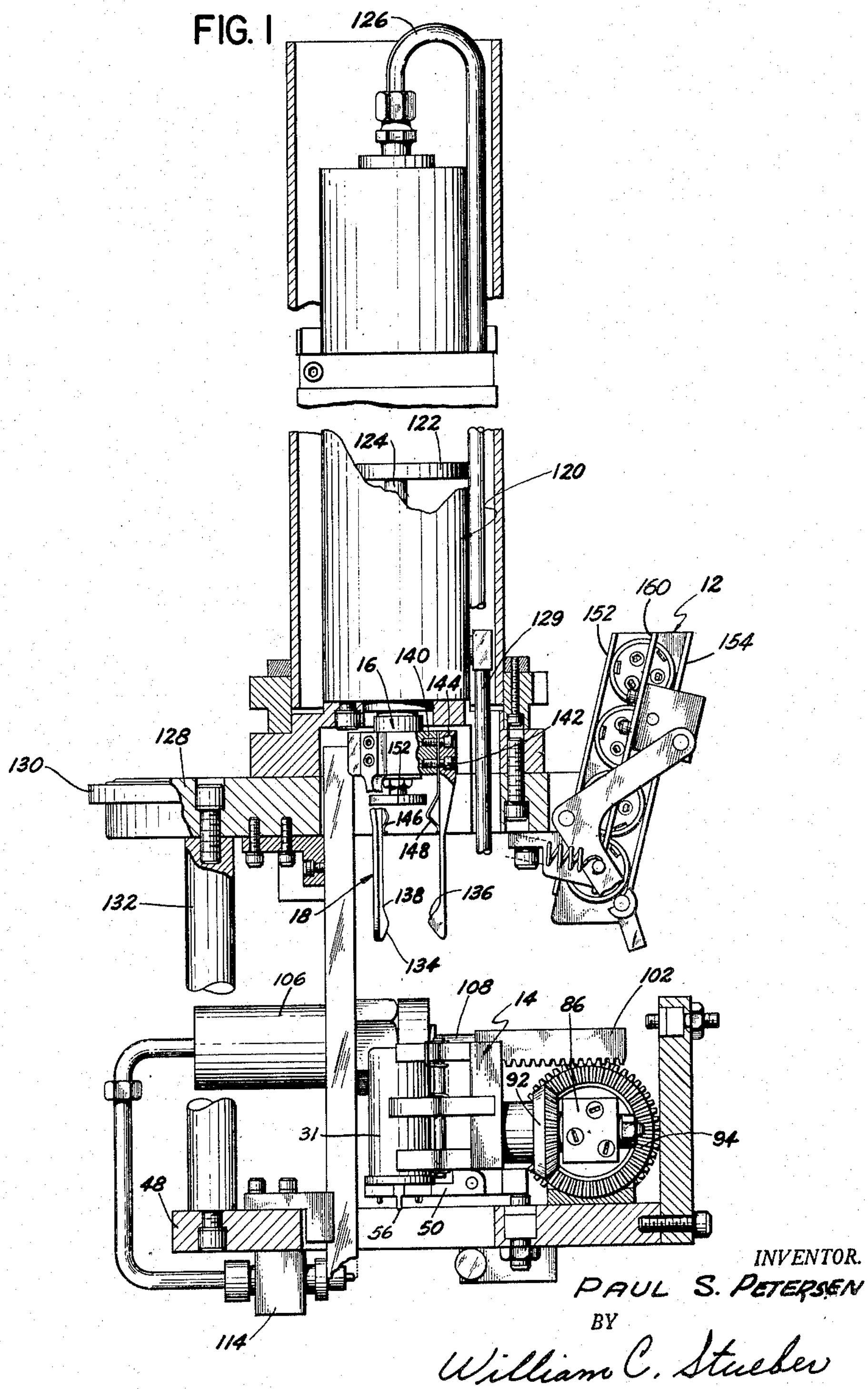
Figure 1 is a side elevational view of the machine with portions being shown in section to better illustrate the construction of the mechanism.

The mechanism shown in the drawings and described herein illustrates the preferred embodiment of the invention and as shown, operates to attach an electrical component to a circuit board. The components illustrated and described are electrolytic capacitors which have cylindrical bodies with terminals projecting from the lower end. It will be understood, however, that components of various types could be handled by the present machine and the machine, as shown, is adapted to handling a component can with terminals projecting from the lower end. The machine could, however, with minor adaptations be adapted to handle components of different sizes and shapes.

The mechanism generally includes a magazine 12 which contains stacked components. The components are fed individually from the magazine to a positioning mechanism 14. This positioning mechanism receives the components in a horizontal position from the magazine and turns them to a vertical position and also transports them to a location over the circuit board where they may be inserted into the circuit board.

When the component cans are in their proper position over the circuit board, they are forced downwardly to push the terminals into holes in the board by an inserter shown generally at 16. In order to insure that the can is accurately positioned above the holes in the circuit board and to insure that the terminals will precisely enter the holes in the board, a component centering mechanism shown generally at 18 is provided and this engages the sides of the component can to center the can above the holes.

Turning now to the more detailed explanation of the mechanism, the operation and function of the positioner mechanism 14 will first be described.

Figures 2, 3, 4:
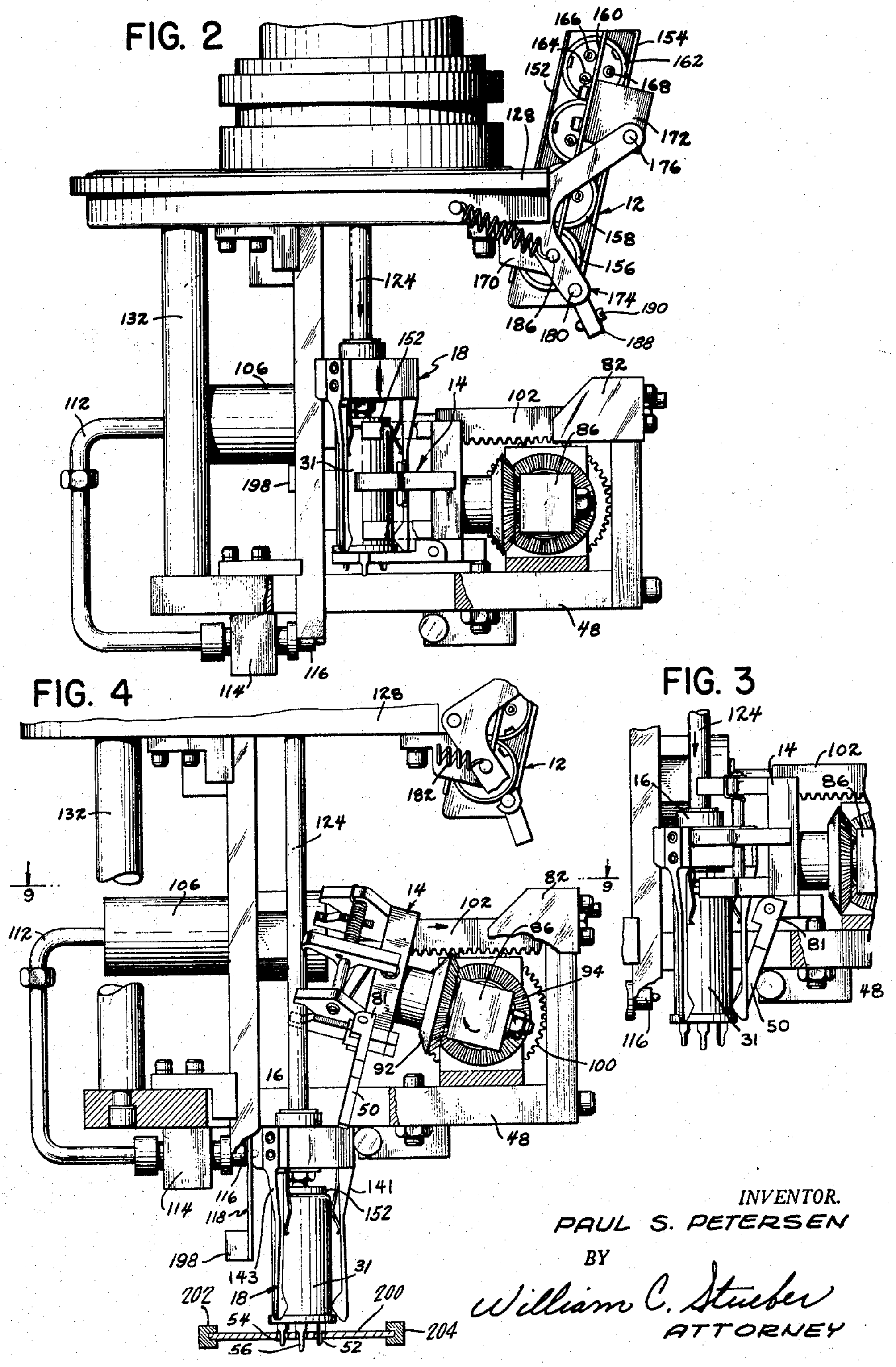
Fig. 2 is a side elevation of a portion of the machine showing the related elements in a different position from Fig. 1.
Fig. 3 is a detailed view of a portion of the machine illustrating the component can being pushed downwardly to be inserted into the circuit board.
Fig. 4 is a side elevational view similar to Figs. 1 and 2 but showing the can positioning mechanism being returned.
Figures 5, 6:
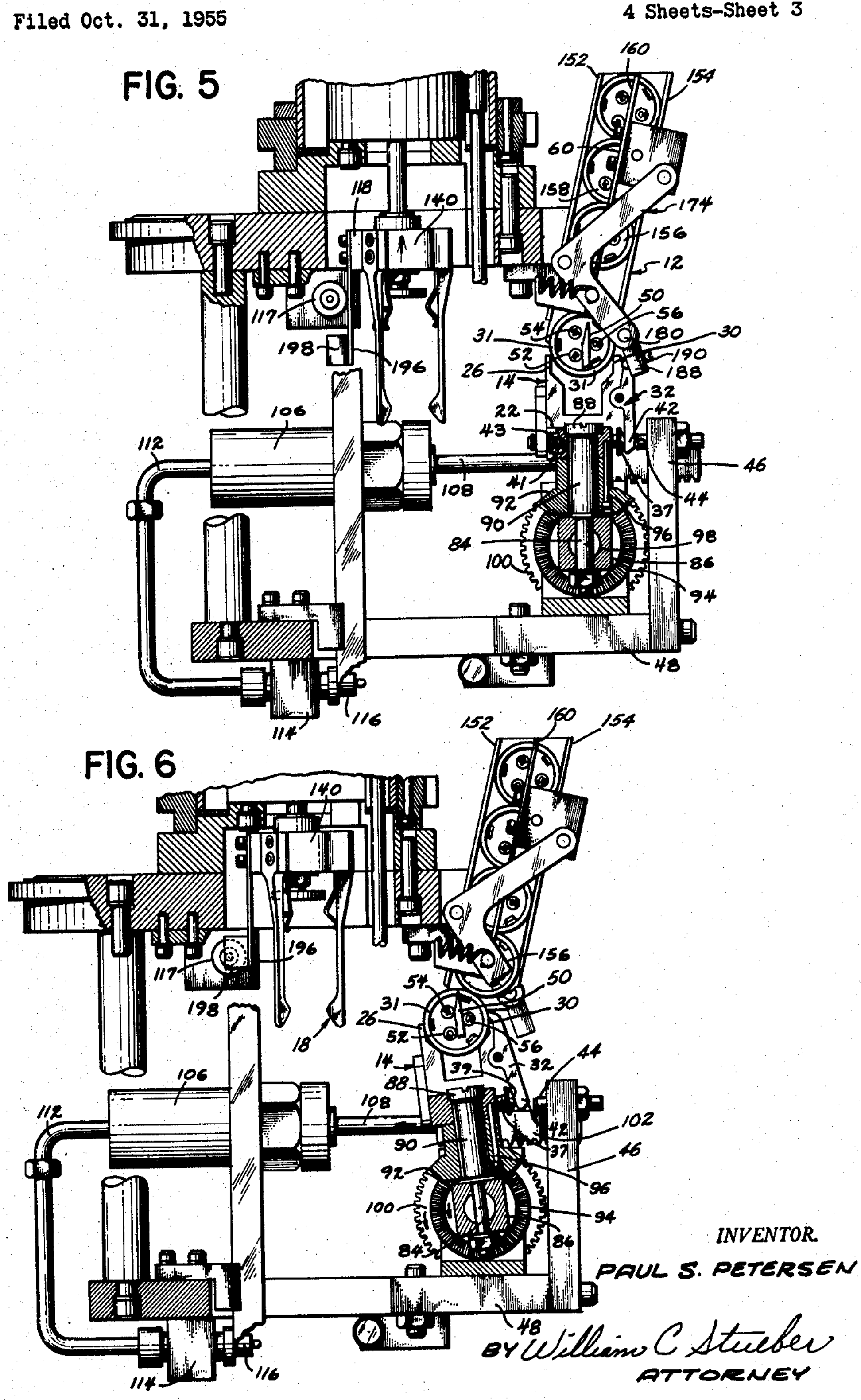
Fig. 5 is a side elevational view of a portion of the machine illustrating the can positioning means receiving a new component can from the magazine.
Fig. 6 is another side elevational view similar to Fig. 5 illustrating a new component can having been deposited in the positioning mechanism and beginning to move to the insertion position.

The positioning mechanism 14 is shown in Fig. 1 after it has transported a component can 31 to a position elevated above the circuit board. The can 31 has been received by the positioning mechanism in a position shown in Fig. 5. In Fig. 6, the positioning mechanism is shown beginning its travel toward the insertion position of Fig. 1 and has begun to turn the can to a vertical position. In Fig. 4, the positioning mechanism 14 is shown being returned to a position where it receives a new can.

Figures 7, 8, 9, 10:
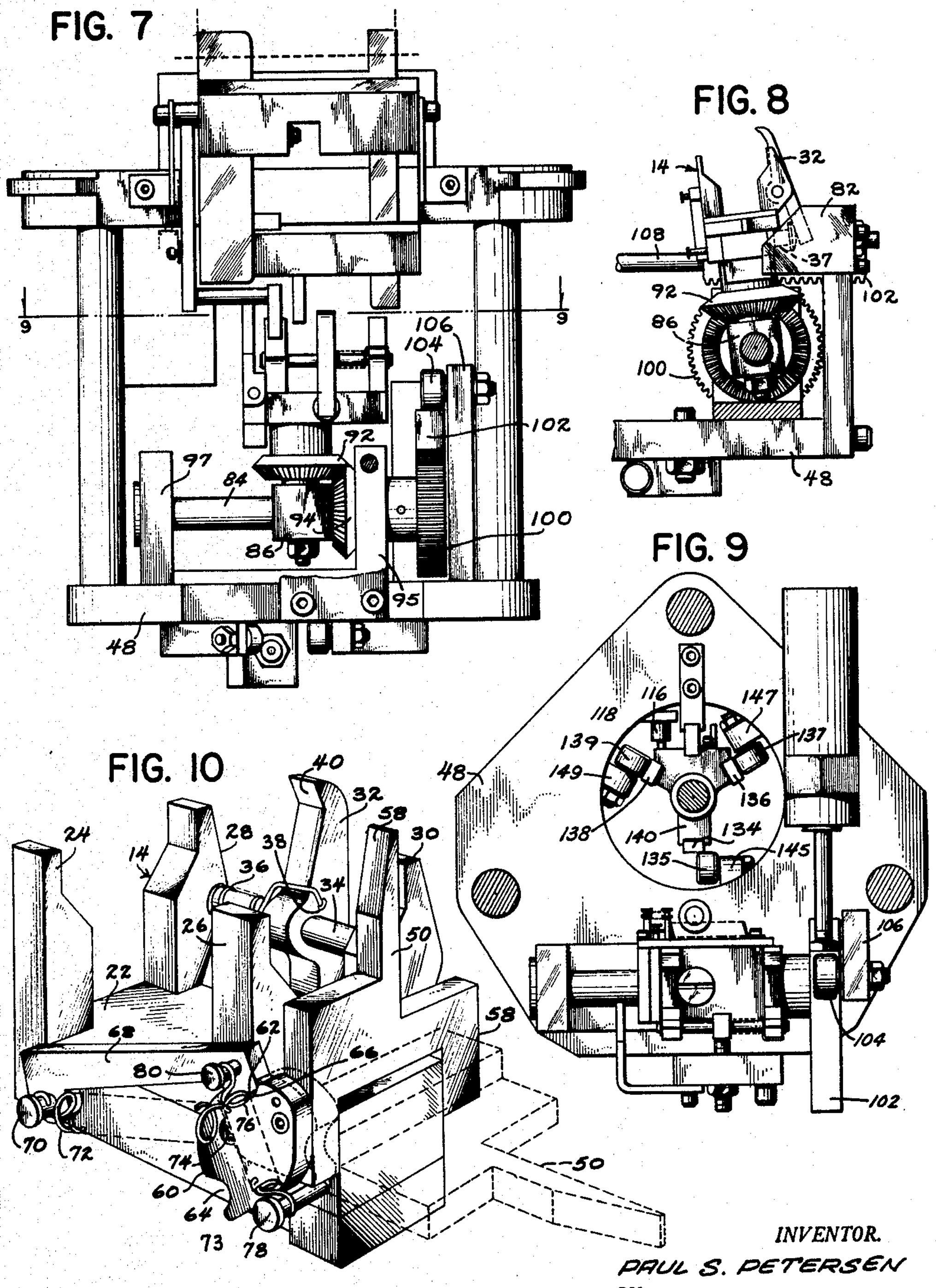
Fig. 7 is a front elevational view of the mechanism having portions removed for clarity.
Fig. 8 is a detailed view illustrating the action of the finger which clamps the individual component cans in the positioning carrier.
Fig. 9 is a sectional view taken along line 9—9 of Fig. 4.
Fig. 10 is a perspective view of the carrier for the positioning mechanism.

The positioning mechanism 14, as shown in Figs. 5 and 10, has a holding mechanism which includes a plate 22. Secured to the plate 22 are can holding fingers and the fingers at one side of the plate are numbered 24 and 26 and at the other side of the plate, 28 and 30. These fingers project upwardly when the positioning mechanism is in the receiving position of Fig. 5 and the can 31 is dropped from the magazine 12 into the fingers. The mechanism for releasing the individual cans will be described later in greater detail.

After the component can 31 is dropped between the holding fingers 24, 26, 28 and 30, a gripping finger 32 clamps the can in these holding fingers.

The gripping finger 32 is pivotally mounted on a shaft 34 which is secured at its ends between the two fingers 28 and 30. A coil torsion spring 36 projects into a hole 38 in the gripping finger and is anchored at its opposite end to urge the gripping finger 32 to rotate in a direction to grip the can. The outer end 40 of the gripping finger is beveled inwardly slightly to provide a can engaging surface. When the gripping finger is released, the spring 36 will cause the finger to pivot in a counterclockwise direction in Fig. 10 to grip the can securely and the position of the can and gripping finger is shown in Fig. 6.

While the can is in the receiving position of Fig. 5, however, the gripping finger 32 is held in non-gripping position by its lower end 42 being engaged by a stop 44. This stop is adjustably secured to a framepiece 46 which is part of the main frame 48. It will be seen that as the positioning mechanism is moved from the position of Fig. 5 to the position of Fig. 6, the lower end 42 of the gripping finger 32 is moved away from the stop 44, thus permitting the torsion spring 36 to cause the finger to grip the can securely within the holding fingers 24, 26, 28 and 30.

The action of the coiled torsion spring 36 rotating the gripping finger 32 to a position to tightly grip the can 31 is aided by a spring loaded plunger 37. The plunger has a head 39 which engages the lower end 42 of the gripping finger to urge the gripping finger 32 to pivot in a counterclockwise direction. The plunger is slidably mounted in a bore 41, Fig. 5, in the base plate 22. A compression spring 43 is also enclosed within this bore and is connected to the plunger 37 in such a manner to urge the plunger outwardly or to the right as shown in Fig. 5. This compression spring 43 is also compressed as the plunger is pushed inwardly when the base 42 of the pivotal gripping finger 32 strikes the stop 44 to pivot it in a clockwise direction in order that the can 31 may drop into the holding fingers as shown in Fig. 5.

With the can thus securely held by the mechanism shown in detail in Fig. 10, the can is transferred or transported to an insertion position, this position being shown in Fig. 1. Although the can is securely held between the fingers by virtue of the friction between the fingers and the side of the can, an additional holding arm 50 is provided and this arm projects across the base of the can.

The arm 50 is narrow, Figs. 5 and 6, so that it extends between the terminals 52, 54 and 56 of the can 31. With this construction, the arm aids in holding the can within the holder to prevent it from sliding downwardly when the can is in the position of Fig. 1 and it also helps maintain the can in an oriented position so that it will not twist. The arm 50, as shown in detail in Fig. 10, is tapered to almost a point as shown at 58 so that the arm will pass between terminals 52 and 54 when the can is dropped out of the magazine 12 from the position of Fig. 5 to the position of Fig. 6. It will be noted in Fig. 5 that the holding arm 50 extends to almost meet the orienting bar 60 which is part of the magazine 12. With this close proximity as the can drops from the magazine to the holder of the positioner 14, the can cannot possibly rotate to lose its proper oriented position which is maintained in the magazine 12.

The lower arm 50 is pivotally hinged to the plate 22 and is movable between the solid line position of Fig. 10 and the dotted line position. In the solid line position, the arm extends between the terminals 52, 54 and 56 of the component can 31 as is shown in Figs. 5 and 6 and in the solid line position of Fig. 3 the arm swings free of the can so that it may be pushed downwardly to have its terminals inserted into the board. The arm in this position is illustrated in Fig. 3 wherein the can is being pushed downwardly.

The arm is integral with a base 58 which is pivotally mounted on the plate 22 and at the edge of the base 58 is a round latching member 60 which is provided with notches 62 and 64. These notches are so positioned that the tip 66 of a pawl 68 drops into one of the notches to temporarily hold the arm 50 in either the solid or the dotted line position of Fig. 10. The pawl is pivotally mounted at the side of a plate 22 on a pin 70. A spring 76 holds the pawl against the round latching member and the spring is connected at its ends to a pin 80 on the pawl and a pin 78 on the base 58 of the arm. The arm 50 and its supporting base are urged to the holding solid line position of Fig. 10 by a tension spring 72 which connects between the pin 70 and another pin 74 which is secured to the round latching member. This pin 74 is located above the pivotal axis of the arm 50 which is represented by the pin 73, so that the tendency of the spring 72 is to urge the arm 50 to the solid line position of Fig. 10. When the arm is in the dotted line position, however, it will be prevented from moving to the solid line position by the tip 62 of the pawl 68 dropping into the notch 66 of the latching member.

When the positioning member 14 is in the location shown in Fig. 5, the arm 50 is in the solid line position of Fig. 10. The arm remains in this position while the positioning mechanism 14 moves from the location of Fig. 5 to the location of Fig. 1 where the component can is in position to be attached to the circuit board. As will be seen in Fig. 1, in this position the arm 50 is still beneath the can holding it in place and holding it in its oriented position. When the can is pushed downwardly and away from the holding member of the positioner 14, the arm 50 is likewise pushed downwardly and this action may be observed from Fig. 3. In this figure, it will be seen that as the can moves downwardly, its lower edge pushes the arm 50 downwardly. By the time the pusher mechanism 16 will have traveled to its lowermost position to inert the terminals of the can into the board as is shown in Fig. 4, the arm 50 will be pushed completely to its out of the way position as shown in Fig. 4. In this position, the arm is in the same relative position as shown by the dotted line position of Fig. 10.

The arm 50, however, is returned to its retaining position, which is the solid line position of Fig. 10, while the positioner is being moved back to its receiving location. In the view of Fig. 4, the positioner 14 is in the process of moving back to the receiving position of Fig. 5. During this travel, the lower edge 81 of the arm base 58 engages the return cam 82 which is shown in Fig. 4. This return cam has a sloping edge which cams the base 58 of the arm 50 to its return position. The return cam 82 is mounted on the frame piece 46 as will be seen in Fig. 4.

Thus as the positioner member 14 carries the component can from the receiving position of Fig. 5 to the insertion position of Fig. 1 the holding arm 50 remains in its closed position. When the component can is pushed downwardly to have its terminals inserted into the circuit board in the manner shown in Fig. 4, the arm 50 is pushed downwardly and is latched in that position by virtue of the end 62 of the pawl 68 of Fig. 10 dropping into the notch 66. This open position for the arm is only temporary, however, since as the positioner 14 moves back to the location of Fig. 5 where it receives a new can, the base 81 of the arm 50 engages a return cam 82 which cams it back to its holding position so that it is ready to receive and keep in oriented position a new component can 31 as the can drops from the magazine as shown in Fig. 5.

In order to transfer an individual component can from the position of Fig. 5 to the insertion position of Fig. 1, the positioner 14 must be swung through 90 degrees and must be also rotated about its base so that the can position is changed from a horizontal position to a vertical position.

In order to effect this, the holder is mounted upon a shaft 84 as shown in Fig. 5. This shaft extends through a bearing block 86 which is itself rotated about an axis perpendicular to the shaft 84. The axis of the shaft 84 extends at right angles to the position of the component can as it is located in the magazine as shown in Fig. 5.

To attach the component holder or carrier 14 to the shaft 84, the shaft extends upwardly to receive a screw 88 which is extended down through a hole in the plate 22. A bushing 90 is placed over the shaft 84 and this bushing carries a first bevel gear 92 which meshes with a stationary or fixed bevel gear 94. The first bevel gear 92 is locked to the positioner 14 by a pin 96 which extends partway through the gear into the plate 22. Thus, unless the first bevel gear 92 rotates, the positioner 14 cannot rotate. It will be seen, however, that as the positioner is pivoted to the left as shown in Fig. 5, that the first bevel gear 92 will ride against the stationary bevel gear 94 causing rotation of the holder 14 about the shaft 84. Thus as the positioner 14 is rotated through 90 degrees from the position of Fig. 5 to the position of Fig. 1, the positioner 14 is also rotated about the shaft 84 through 90 degrees, which rotation is about the axis perpendicular to the axis of the component can.

The bearing block 86 as shown in Fig. 5 is secured to a shaft 98 which extends horizontally through the opening in the center of the fixed gear 94 and at its end the shaft 98 carries a gear 100 which is illustrated in Figs. 7, 1 and 2. This gear 100 is engaged by a rack 102 which reciprocates horizontally to rotate the gear 100 and the shaft 98.

It may be seen in Fig. 7, the fixed gear 94 is secured to an upstanding bracket 95 which is mounted on the main frame 48. The shaft 84 extends through this bracket and is journalled therein with the other end of the shaft 84 being journalled in the bracket 97 which is also secured to the frame.

The rack 102, as is illustrated in Fig. 7, is held in contact with the gear 100 by a roller 104. This roller is secured to an upstanding bracket 106 which is mounted on the frame 48.

The rack 102 is reciprocated by an air cylinder 106 and a piston rod 108, which is secured to a piston within the cylinder, is connected directly to the rack 102, as is shown in Fig. 6. The operation of the piston within the cylinder 106 and the reciprocation of the rack 102 is controlled by air fed to the cylinder through a line 112. The line 112 is supplied with a suitable source of pressurized air through a valve 114. This valve 114 is controlled by a control switch 116 which may control the valve electrically. Instead of the switch 116, a direct plunger may be used for the valve but preferably a switch is used. This switch is engaged by a switch operating projection 118 which is carried on the inserter and which depresses the switch in the manner shown in Fig. 4. To return the piston within the cylinder 106, air is admitted to the other end of the cylinder through a return line, not shown, and the line 112 is vented. Air pressure to this return line is controlled by an air switch 117, which is controlled by a switch depressing slide 198 carried on an arm 196 as shown in Fig. 6. The function of the air switches 116 and 117 will be explained later in connection with the overall operation of the mechanism.

Thus it will be seen that when the positioner 14 is to be moved from the component can receiving position of Fig. 5 to the can inserting position of Fig. 1, the rack 102 is moved to the left. This is, of course, accomplished by the piston rod 108 which moves to the left in Figs. 1 and 5. When this occurs, the gear 110 is rotated in a counterclockwise direction, thus rotating the shaft 84 in a counterclockwise direction and this rotates the bearing block 86 carrying the shaft 84 which supports the positioner 14. When the positioner 14 rotates to the left, the first bevel gear rides against the fixed bevel gear 94 to pivot the holder about the shaft 84 to turn the component can 31 from a horizontal position of Fig. 6 to a vertical position of Fig. 1.

When the positioner 14 is later moved from the inserting position of Fig. 1 back to the receiving position of Fig. 5, the rack 102 is moved to the right as shown in these figures. When this occurs, the entire carrier is swung up through 90 degrees and simultaneously the first bevel gear 92 will ride against the fixed bevel gear 94 to rotate the carrier 14 back to the horizontal from the vertical position. In this position, the carrier 14 is again ready to receive a new component can as is shown in Fig. 5.

The container or component can 31, when it is in the position of Fig. 1, is pushed downwardly or carried downwardly to the position of Fig. 4 where the terminals are inserted into the circuit board shown at 200.

The board is suitably supported such as by guides 202 and 204 which hold the board in the component receiving position. The component is of course centered properly above the board so that the terminals 52, 54 and 56 will enter the board.

The insertion of the component is accomplished by the inserter mechanism shown generally at 16. This mechanism descends on the component can and pushes it toward the circuit board to push the terminals into the holes in the board. Accompanying the inserter mechanism is a centering mechanism shown generally at 18 which positively aligns the position of the can so that it will be properly centered when the components enter the hole. This alignment is essential since the positioner 14 brings the can into general alignment only and because the positioner 14 departs from the can as is shown in Fig. 4 at the time it is being inserted.

The inserter and aligning mechanisms 16 and 18 are lowered upon the can and are operated by a pneumatic cylinder 120. Within this cylinder slides a piston 122 which is attached to a piston rod 124. The inserting and aligning mechanisms 16 and 18 are secured to the lower end of this piston rod 124.

The piston within the cylinder is operated by air admitted to the cylinder through an upper line 126 and a lower line 129. These air lines lead to a suitable pneumatic valve which controls the supply of air thereto. The valve for controlling the operation of cylinder 120 is given a timed operation to periodically lower and raise the piston. This may be accomplished by cam-operated switches such as shown in the co-pending application, Machine for Assembling Circuit Components, Bergsland et al., and in that type of machine the presently described mechanism would work simultaneously with a number of other attaching heads which would attach other components, and a conveyor would carry a series of circuit boards past a series of attaching heads.

The pneumatic cylinder 120, Fig. 1, is mounted on top of the casting 128 which provides support for the machine as a whole. This casting has an annular lip or flange 130 which will rest on a supporting casting and will be clamped therein. The supporting casting will also be circular in shape so that the mechanism as a whole may be rotated to the proper operating position relative to the guides 122 and 124, Fig. 4, which support the circuit board. A supporting post 132, Fig. 1, extends beneath the frameplate 128 to connect at its lower end to the frame plate 48 and thus aid in support of the remaining mechanism.

Viewing in succession Figs. 1, 2, 3 and 4, the relative position of the various elements may be seen as the inserter 16 and the centering mechanism 18 descend upon the component can 31 to insert its terminals into the circuit board 200. In Fig. 1, the component can is held in inserting position by the positioner 14. The positioner fingers extend horizontally to frictionally engage the side of the can and the can is held against the fingers by the spring urged finger 32 as was previously described. the horizontal fingers 24, 26, 28 and 30 and the locking finger 32 are so spaced that the downwardly projecting arms 134, 136 and 138 of the centering mechanism will pass between the fingers to frictionaly slide downwardly over the cylindrical body of the component can. The plan view of the centering arms is shown in Fig. 9.

The centering fingers 134, 136 and 138 are supported at their upper ends from a base or a chuck 140. The fingers are secured to the outer edges of the chuck 140 and are secured to the arms of the chuck 140 such as by bolts 142 and 144 which hold finger 136 as may be seen in Fig. 1. Each of the fingers is connected to the chuck 140 in the same manner as the finger 136 and therefore only this construction need be shown in detail.

At the upper end of each of the fingers is an additional spring centering device 146, 148 and 150. The springs are clamped between the centering fingers and the chuck and are held by the bolts which hold the fingers to the chuck. The spring fingers 146 and 148 project inwardly to engage the upper end of the component can to maintain the can in a vertical position as it is being pushed into the board in the manner shown in Figs. 2, 3 and 4.

As the centering mechanism descends, the fingers 134, 136 and 138 first slide over the can to center it and as they reach the bottom of the can the spring fingers 146, 148 and 150 slide over the can as shown in Fig. 2. At this point, a pusher plate 152 engages the base of the can. This plate has a flat lower surface and is round in shape and of a size slightly smaller than the can so as to engage its flat end. Thus, when the piston 122 descends within the cylinder 119, the centering fingers first surround the can and then the pusher 152 engages the bottom of the can to push it downwardly, removing it from the positioning mechanism 14. Continued downward movement of the centering mechanism and the inserter 16 pushes the terminals 52, 54 and 56 into the circuit board 200, as shown in Fig. 4.

When the centering fingers 134, 136 and 138 have slipped completely over the can to hold it, and the pusher plate 152 has engaged the base of the can to move it downwardly, the can is carried downwardly as illustrated in Fig. 4 and the positioner 14 leaves the can, moving upwardly to obtain a new can.

It will be noted from Fig. 4 that the piston rod 124 extends downwardly for a considerable distance when the pusher 152 and the centering fingers are extended. In order that the can will be accurately and properly positioned with respect to the holes in the circuit board 200, a series of three rollers are provided as shown at 135, 137 and 139 in Fig. 9. The centering fingers are so shaped so as to have an inclined shoulder as illustrated at 141 and 143 in Fig. 4. These inclined shoulders insure that the centering fingers are gradually centered between the rollers 135, 137 and 139, Fig. 9, and as the centering fingers reach their lowermost position where the component terminals are inserted into the board, the centering fingers are held firmly between the rollers 135, 137 and 139. This may be seen in Fig. 9. The rollers are rotationally held on brackets 145 and 147 and 149 which are supported from the frame piece 48.

It will be noted from Fig. 4 that as the terminals of the component can 31 are inserted into the board, the positioner 14 is returning to a position to receive a new component can. When it reaches the position of Fig. 5, the can will automatically be dropped into the positioner 14.

The cans are supported above the receiving position of the positioner in a magazine 12. The magazine, as shown in Figs. 1, 2, 5 and 6, consists of a U-shaped channel having upper and lower parallel plates 152 and 154 which are suitably connected to the frame piece 128. These plates are spaced so as to hold the component cans as illustrated by 156 and 158 in a horizontal position stacked on top of one another. The channel is open at the front and spaced midway between the two plates is an orienting bar 160 which is sufficiently narrow to pass between the terminals of the component. Thus it will be seen by components 162 of Fig. 2 that the bar 160 extends between the two terminals 164 and 166 and the third terminal 168. With this position, the component cans cannot rotate since their terminals will engage the upper or lower edge of the bar.

The bar 160 which maintains the component cans in their oriented position also supported from the casting plate 128 by being supported from a bracket 170, Fig. 2, which is connected to the casting plate 128. The orienting bar 160 supports a gate carrying block 172 on which is pivotally hung the componet release gate 174. This gate is shown generally in Fig. 2 in the form of a bell crank and the upper end of the bell crank is pivotally mounted on the block 172 by a pin 176. At the lower end of the gate is connected a pin 180 which projects inwardly into the magazine to block the lowermost component 156 and hold back the components in the magazine.

This pin 180 will block the path of the components until the gate 174 is moved to the right or pivoted in a counterclockwise direction as shown in Fig. 2. When this occurs, the pin 170 will be moved out of the way of the lowermost component 156 to permit it to drop into the positioner 14 in the manner shown in Fig. 5, the dropped can being numbered 31 in Fig. 5.

To hold the gate in the closed position to support the stack of components, a coil tension spring 182, as shown in Fig. 4, is connected between the pin 186 on the gate member and the other end of the spring is connected to a pin on the casting plate 128.

For moving the gate to the open position to release a component can, the gate is pivoted in a counterclockwise direction. For this purpose, a release arm 188, Fig. 5, projects downwardly from the lower end of the gate. This release arm is operated and engaged by the gripping finger 32 of the positioner 14. As will be seen from Fig. 5, when the positioner is moved to the component can receiving position, the lower end 42 of the gripping finger 32 strikes the stop 44. This causes the gripping finger 32 to pivot in a clockwise direction, and the upper end of the finger 32 engages an adjustment screw 190 of the release arm. This adjustment screw is threaded into the release arm 188 to adjust the position of the gate when it is engaged by the fingers. When the gate is pivoted to the right as shown in Fig. 5, the holding pin 180 of the gate moves to the right to release the lowermost component shown at 31 in Fig. 5.

In order that the stack of components above the lowermost component 31, as shown in Fig. 5 by the components 156 and 158, do not fall downwardly, the gate member 174 contains a stop pin 192 which is moved into the path of the component cans when the gate is in open position of Fig. 5. Thus it will be seen that the pin 192 blocks the descent of the can 156 thus holding the stack of components above it. When the gate again moves to closed positon by virtue of the release arm 188 being released by the finger 32, the pin 192 again moves out of the path of the component 156 as shown in Fig. 5 but the pin 180 will move into the path of the components thus permitting the entire stack of components to move downwardly until the lowermost component can 156 strikes the pin 180 which stops the stack. The stack is thus in position, as shown in Fig. 6, for release of the next component 156 when the positioner 14 later again moves back to receive a new component container.

Thus it will be seen that the stop 144 functions not only to pivot the gripping finger 32 to release position so that a new component can may drop into the positioner 14 but it also functions to pivot the finger clockwise so that it will engage the arm 188 to move the gate 174 to an open position and to release a component can. When the positioner 14 begins its travel to carry the can from the receiving position to the insertion position as is shown in Fig. 6, the gate is released and the tension spring 182 moves it back to its closed position. The plunger 37 and the coil spring 36 also aid in moving the gripping finger 32 to a position to grip the can firmly in the fingers of the positioner 14.

Although previously referred to, it will be noted that when the centering mechanism 18 and inserter 16 descend to push the terminals of the component into the board as shown in Fig. 4 that the shoulder 118 engages the switch 116, Figs. 4 and 9. This actuates the valve 114 to operate the piston within the cylinder 106 to return the positioner 14 to the component receiving position. The lower switch 116 therefore functions to operate the return of the positioner 14.

It will be further noted that when the inserted and centering mechanism attain the raised position of Fig. 6 that a switch engaging shoe 198 of the arm 196 engages the switch 117. The switch arm 196 is secured to the chuck 140 to extend downwardly to be in a position to operate the switch 117 when the chuck mechanism is in the raised position of Fig. 6. The switch 117 is connected to the valve 114 in such a manner to cause it to operate the positioner 14 so that it will begin moving to carry the can to the insertion position. Thus, in Fig. 6, the switch 117 has just been depressed since the arm 196 has moved from the position of Fig. 5 to the position of Fig. 6.

It will be seen that I have provided a simplified, rugged mechanism which functions to receive component cans from a magazine and insert their leads into holes in a circuit board. The mechanism is capable of automatic operation and will continue to successfully attach cans to a circuit board as long as the magazine is kept full and new circuit boards are positioned beneath the mechanism.

Although the operation of the machine as a whole will now be understood from the previous description, a brief resume is believed in order.

Beginning with Fig. 6, the switch 117 has just been depressed. Depression of this switch actuates the valve 114 to cause a flow of air to the cylinder 106 which moves the positioner 14 from the can receiving position of Fig. 5 to the can insertion position of Fig. 1. The can has been dropped from the magazine into the fingers of the positioning mechanism at the end of the previous cycle of the machine. This has been caused by the gripping finger 32 engaging the release arm 188 to cause the gate 174 to move to the right to release a can to drop into the positioner 14.

At the beginning of the cycle, the positioner begins to move to the left as shown in Fig. 6 and as the lower end 42 of the gripping finger 32 leaves the stop 44, it snaps against the side of the can 31 to hold it firmly in the fingers of the positioner 14. When the positioner 14 moves from the position of Fig. 6 to the position of Fig. 1, it transports the can to the insertion position and also rotates the can from a horizontal position to a vertical position.

When the can is thus positioned, the machine is ready for operation. The inserter mechanism shown generally at 16 descends upon the can with the centering mechanism shown generally at 18 in Fig. 1 having fingers 134, 136 and 138 which slide over the sides of the component can. These centering fingers hold the can in a centered position when it is pushed downwardly to be taken away from the positioner 14. The centering rollers 135, 137 and 139 of Fig. 9 hold the centering mechanism in position while extended. At the upper end of the positioning fingers are additional positioning springs 146, 148 and 150 which locate the upper end of the can and hold it vertical. The inserter carries a pusher plate 152 which engages the base of the can and exerts force on the base as the terminals 52, 54 and 56 are pushed into holes in the circuit board 120 in the manner shown in Fig. 4.

When the inserter 16 reaches its lowermost position as shown in Fig. 4, the shoulder 118 closes the switch 116 to again activate the valve 114. The valve then functions to admit the air to the cylinder 106 to return the positioner 14 to its component receiving position. While traveling to this position, it again turns from a vertical position to a horizontal position so that it may receive the can. Also while traveling between these positions, the gate 50 which originally projected beneath the component can and which was pushed out of the way when the can was carried downwardly toward the circuit board, is returned to its original position by the return can 82.

When the positioner is out of the way, the cylinder 120 functions to again raise the inserting and centering mechanism to be ready for a succeeding operation.

When the positioner 14 approaches the receiving position the holding finger 32 again strikes the stop 44 to pivot in a clockwise direction shown in Fig. 4 and to move the gate 174 to the right, thus moving the pin 180 out of the path of the stack of components and permitting the lowermost component to drop downwardly. The ascent of the inserter 16 to the return position is accompanied by the shoe 198 on the arm 196 engaging and closing the switch 117. This again brings the positioner into the position of Fig. 1 to have the can in location for a new insertion operation.

Thus, as set forth in the objects, the mechanism presents an improved device for receiving component cans and carrying them from a magazine to an insertion position. Also presented by the present mechanism is an inserter which accurately centers the cans over the board and positively and securely inserts the terminals of the can into the holes in the board. The magazine for supporting the components is simplified in structure and functions to feed the individual cans to the positioner while maintaining them in their oriented position.

The machine is capable of high speed operation and is constructed of rugged elements so that critical adjustments need not be made and the machine is capable of continuous and automatic operation for long periods of time without attention.

I claim as my invention:

1. A mechanism for attaching electrical components to circuit boards, said mechanism having a main frame, the combination including an inserter head means provided with a power means, a positioner provided with a power means, said inserter head means and positioner being mounted on said frame, a magazine for supporting a stack of components in a horizontal position mounted on said frame, gate means actuated by said positioner to release individual components from the magazine when said positioner is in a component receiving position, said positioner receiving said released component in a horizontal position and moved by the power means provided for the positioner until said component is in a vertical position above said circuit board, and said inserter head power means driving said inserter head means into contact with said component to force the terminals of said component into said circuit board.

2. The combination of claim 1 wherein said positioner is provided with opposed gripping fingers to receive the component from said magazine, spring biased finger means mounted on said positioner to push the component against said gripping fingers, whereby said inserting head means forces said components from said gripping fingers when said positioner maintains said component in a vertical position over said circuit board.

3. The combination of claim 1 wherein a centering means operable with said inserting head means engages the component as the component is held in said positioner to center the component terminals in a predetermined relation to said circuit board.

4. The combination of claim 3 wherein the centering means includes downwardly projecting centering fingers adapted to surround the component, and said centering fingers are spring biased and adapted to move downwardly with said inserting head means.

5. The combination of claim 1 wherein said positioner is provided with a foldable orienting arm which is extended across the base of said component received by the positioner, whereby the inserter head means acting on said component in said positioner forces said component downwardly to move said foldable orienting arm away from said component.

6. The combination of claim 1 wherein said positioner is provided with a first rotatable support permitting orientation about an axis perpendicular to the axis of the component, a second rotational support permitting rotation of the first support about an axis parallel to the component when it is received by the positioner, said positioner also including a first fixed gear, a second gear meshing with the first gear and connected to the first rotatable support, said second gear adapted to rotate the support when it is rotated about the said first gear, and means to rotate the positioner about the second support to move the component to insertion position and cause said gears to automatically rotate the positioner about the first support to move the component from a horizontal to a vertical position.

References Cited in the file of this patent

UNITED STATES PATENTS

| | | |
|---|---|---|
| 2,337,667 | Kuehlman | Dec. 28, 1943 |
| 2,572,312 | Burge | Oct. 23, 1951 |
| 2,662,646 | McCain | Dec. 15, 1953 |
| 2,692,424 | Habel | Oct. 26, 1954 |